April 25, 1933. M. J. FORRESTER 1,905,842
DOUBLE DECK PASSENGER VEHICLE
Filed April 14, 1932 5 Sheets-Sheet 2
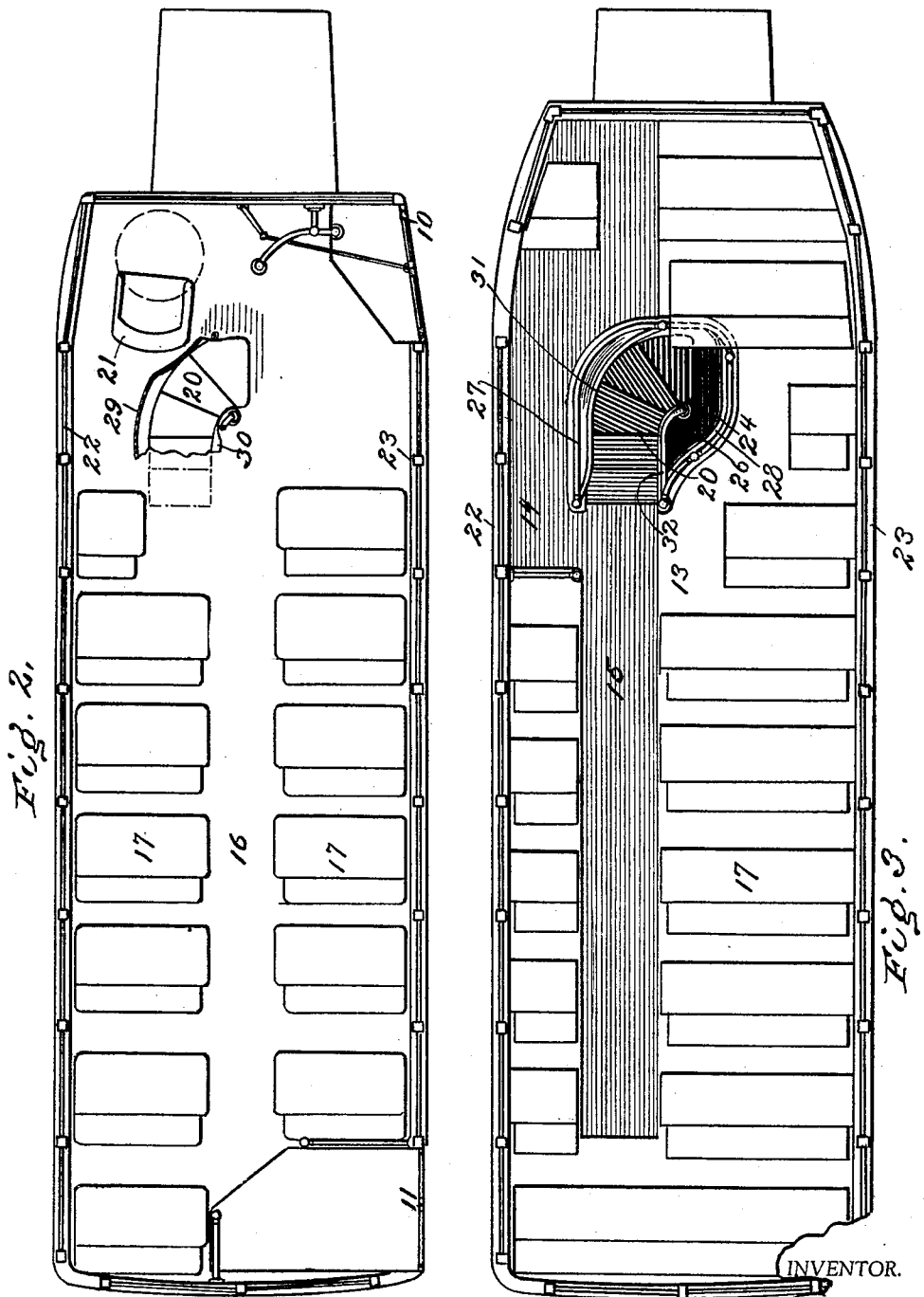
INVENTOR.
M. J. Forrester
BY
Morrison, Kennedy Campbell
ATTORNEYS.

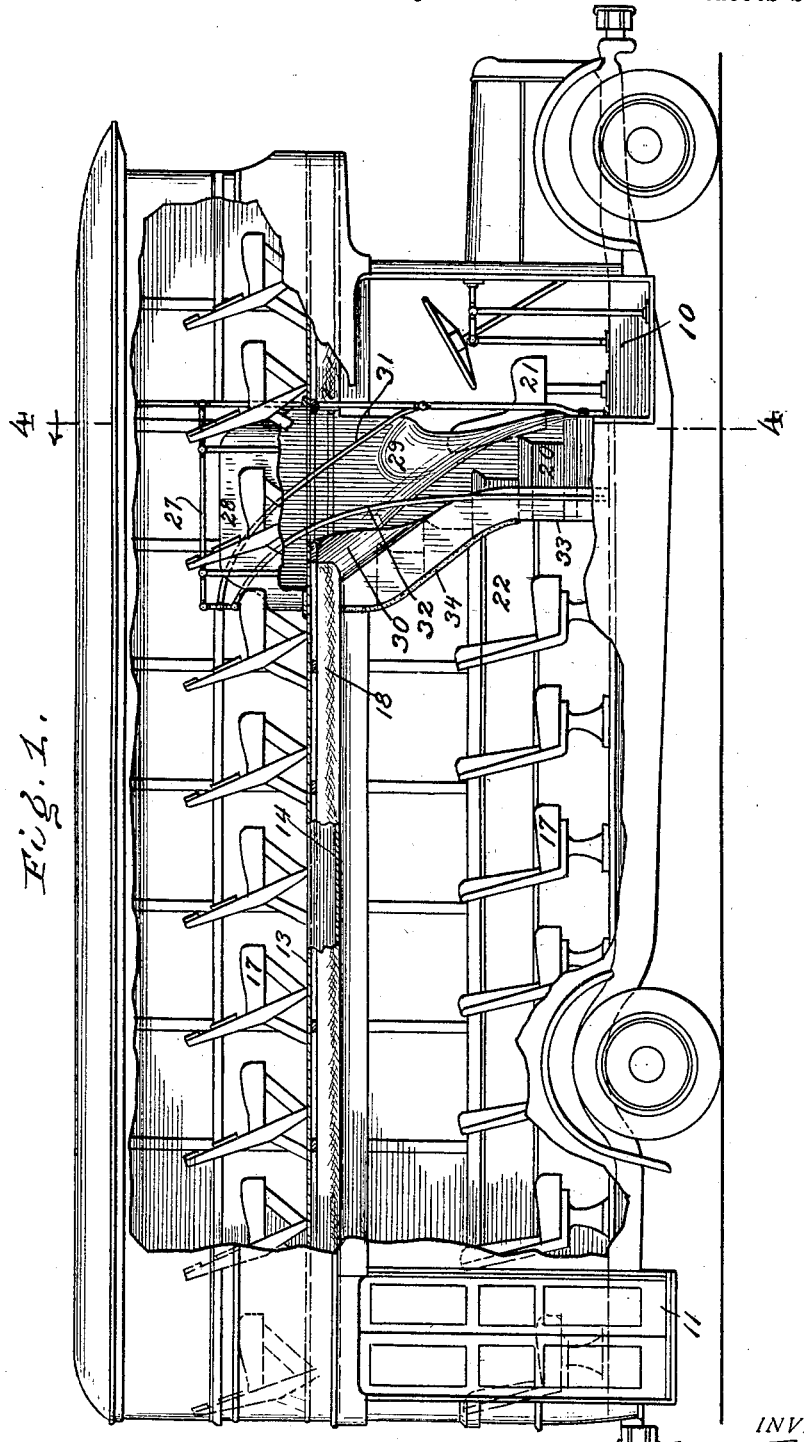

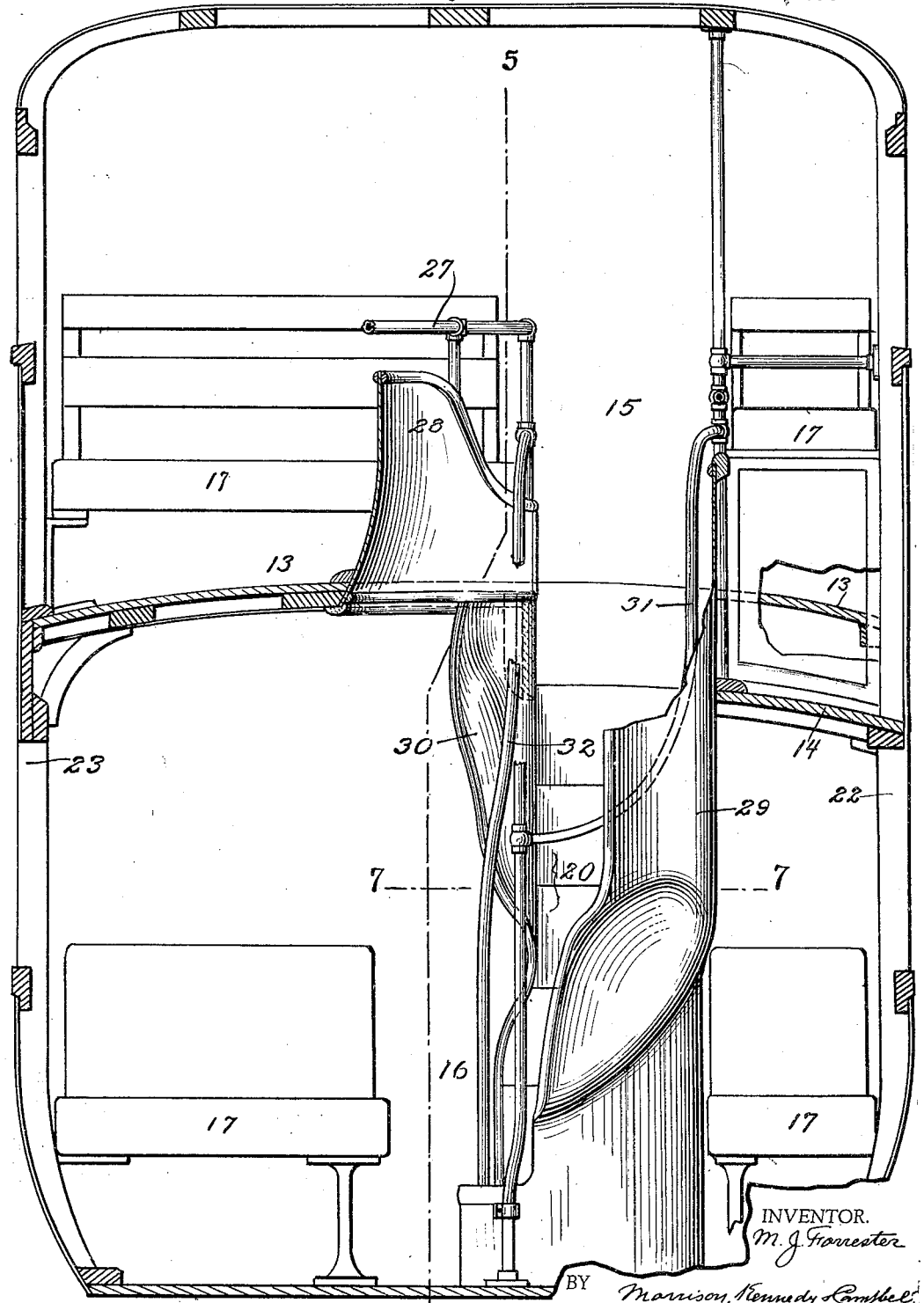

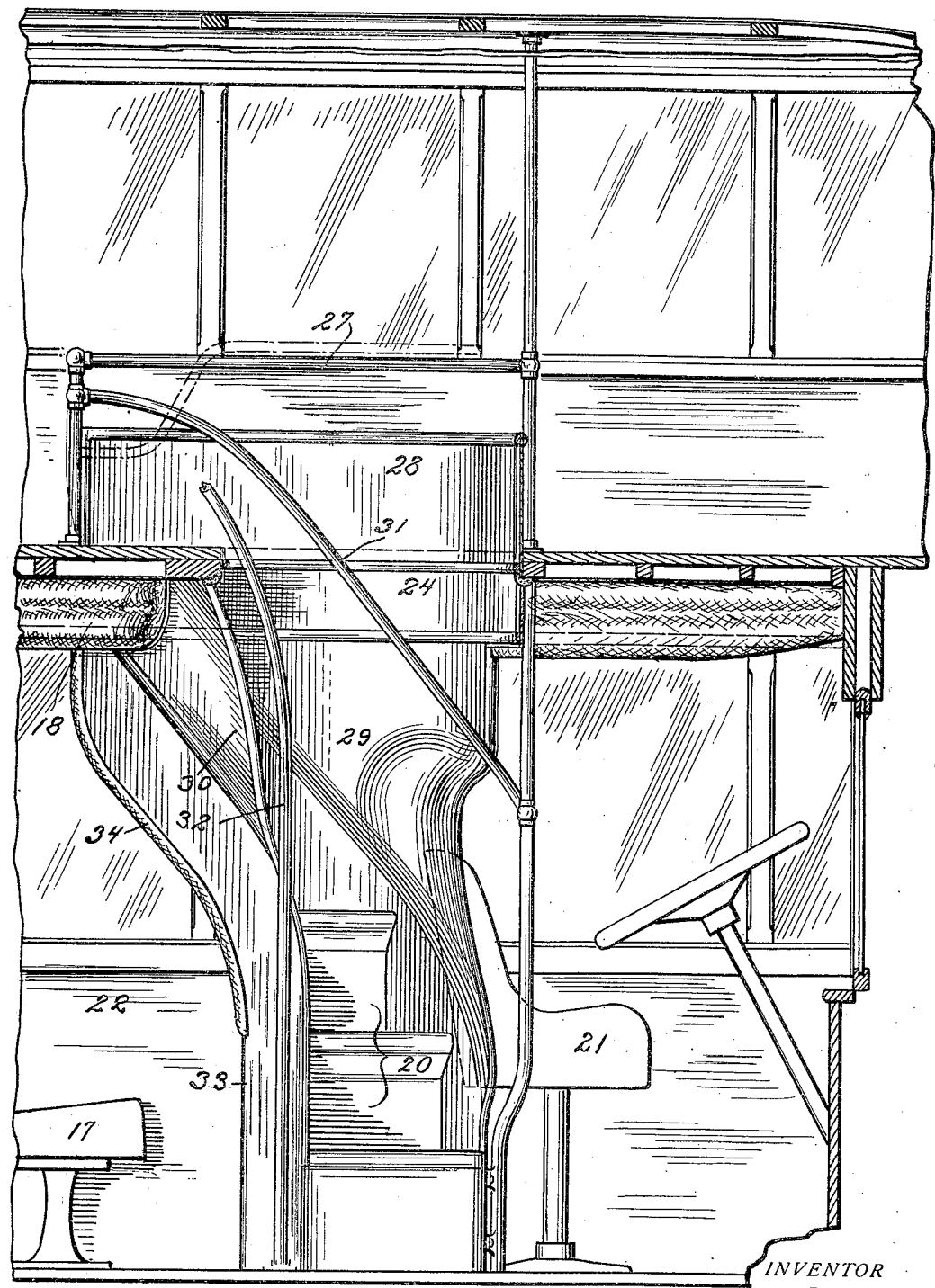

April 25, 1933.  M. J. FORRESTER  1,905,842
DOUBLE DECK PASSENGER VEHICLE
Filed April 14, 1932   5 Sheets-Sheet 5

INVENTOR.
M. J. Forrester
BY Morrison, Kennedy Campbell
ATTORNEYS.

Patented Apr. 25, 1933

1,905,842

UNITED STATES PATENT OFFICE

MICHAEL J. FORRESTER, OF ASTORIA, NEW YORK, ASSIGNOR TO FIFTH AVENUE COACH COMPANY, A CORPORATION OF NEW YORK

DOUBLE DECK PASSENGER VEHICLE

Application filed April 14, 1932. Serial No. 605,180.

This invention relates to passenger carrying vehicles or buses, and more particularly to motor buses of the double-deck type, having the upper deck covered for the protection of passengers from the weather and from the danger of being struck by elevated structures of low head-room under which the vehicle may be caused to pass.

In vehicles of this character it is desirable that the stairway leading to the upper deck be positioned inside rather than exteriorly at the rear, for the safety and convenience of the passengers, particularly when the entrance to the vehicle is at the front. It is also desirable in vehicles of this character that the over-all height be as low as possible, so as readily to permit the same to pass under elevated structures without, however, reducing the head-room so as to inconvenience or jeopardize the passengers.

Buses have previously been built wherein one of the decks, usually the upper one, has two levels with the seats so arranged that the aisle on the lower deck is under the raised portion of the upper deck, and the aisle on the upper deck on the lower level thereof; thus providing sufficient head-room for the passengers on both decks.

Buses have also been built heretofore with inside stairways, but as far as applicant is aware no buses have as yet been designed wherein an inside stairway has been used in vehicles having the upper deck in two levels.

In accordance with this invention a vehicle of the type just mentioned has been constructed having a unique stairway, providing sufficient head-room for the passengers in all parts of the vehicle, and which requires a minimum amount of space, thereby permitting the vehicle to have maximum seating capacity. The stairway is encased as a safety measure, without obstructing the view either up or down the stairway in either direction; thus preventing confusion which might arise in the event of two passengers meeting thereon, particularly when the vehicle is in motion. Furthermore, the stairway is so positioned that it affords no obstruction to the rear view of the driver, particularly on the left which is the side on which other vehicles pass.

The stairway is so constructed that it leads to the region of maximum head-room on the upper deck, provided by the depressed portion thereof, while the lower end of the stairway opens into the region of maximum head-room of the lower deck provided by the elevated portion of the upper deck so that under no circumstance is the passenger cramped for head-room. The upper deck is cut away to a substantial degree above the lower step further insuring the necessary head-room when mounting the said step and, in addition, providing an unobstructed view both up and down the complete length of the partially curved stairway so that a passenger before using the stairs may determine at a glance whether the same are already in use by another passenger coming in the opposite direction.

Other objects of the invention will in part be obvious and will in part appear hereinafter.

The invention accordingly comprises the features of construction, combinations of elements, and arrangements of parts, which will be exemplified in the construction hereinafter set forth and the scope of the application of which will be indicated in the claims.

A better understanding of the invention may be had from the following description together with the accompanying drawings wherein:

Fig. 1 is a partial section longitudinally of a double-deck vehicle showing the general position of the stairway;

Figs. 2 and 3 are plan views of the lower and upper decks respectively, showing the general seating arrangement and the position of the stairwell;

Fig. 4 is a vertical transverse section on an enlarged scale through the bus on line 4—4 of Fig. 1;

Fig. 5 is a vertical longitudinal section approximately on line 5—5 of Fig. 4, showing similarly the details of construction of the stairway;

Fig. 6 is an enlarged plan view of a portion of the upper deck in the vicinity of the stairwell; while

Figure 6:
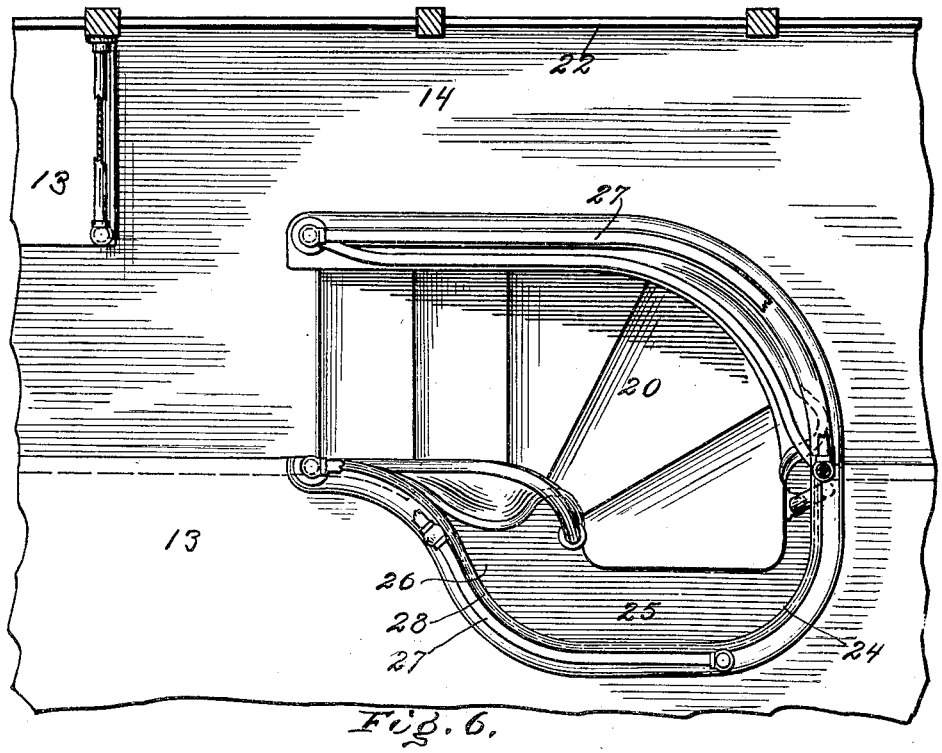
Figure 7:
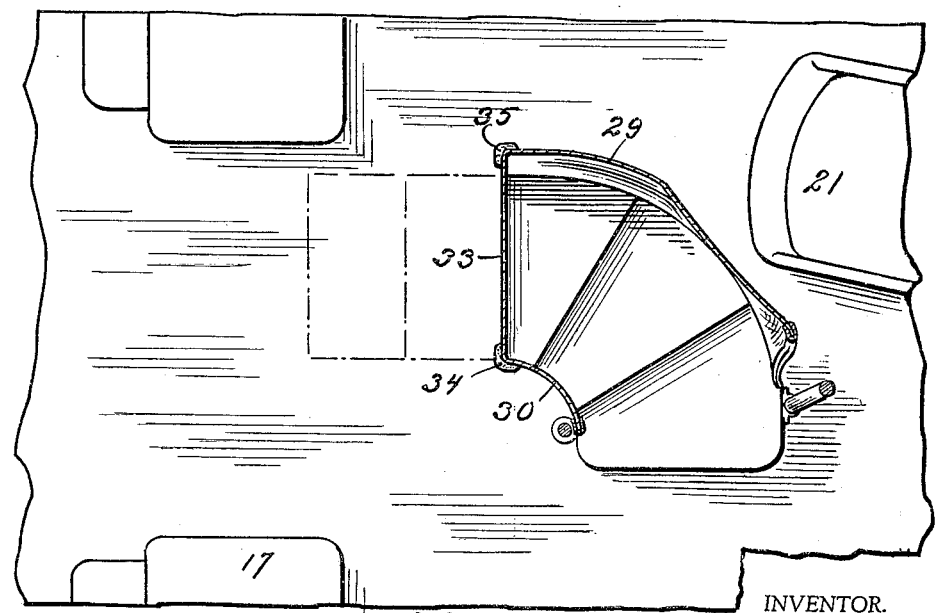
Fig. 7 is a horizontal section through the stairway on line 7—7 of Fig. 4.

Referring now to the drawings it is observed that the vehicle is of the well-known double-deck type having the upper deck covered to protect the passengers from the elements, and also from the danger of injury when the vehicle is passing under elevated structures having low head-room. A door 10 is provided at the front end through which the passengers may enter or leave the vehicle and, if desired, a rear door 11 may also be provided for the same purpose to prevent undue crowding at the front door, or as an emergency exit.

As best shown in Fig. 4 the upper deck of the vehicle is arranged in two levels 13 and 14 extending longitudinally, and providing regions of maximum head-room for both decks on opposite sides of the vehicle. In other words, these regions of maximum head-room are positioned in staggered relation with the aisles 15 and 16 on the upper and lower deck, respectively, arranged longitudinally of the vehicle in these regions of maximum head-room.

Seats 17 are arranged in two rows on the lower deck on either side of the aisle as best shown in Fig. 2. One row, of course, will necessarily be positioned in the region of reduced head-room occasioned by the depressed portion of the upper deck 14, and although the head-room here is not sufficient for a tall passenger standing erect, it does not detract from his comfort in any way when seated. In case this reduced head-room should be momentarily forgotten by the passenger in taking a seat on this side, padding 18 is provided running longitudinally of the bus to protect the passenger from injury.

Seats 17 are also arranged on the upper deck on both sides of the aisle 15 as shown in Fig. 3. Due to the raised portion 13 of the upper deck extending laterally beyond the center of the vehicle to provide head-room for the asle 16 of the lower deck, the seats on this side will accommodate conveniently, say three people, while those on the other side will accommodate one. The off-setting of the upper aisle, therefore, does not decrease the seating capacity in any way. Although it is not essential that the seats on the latter side be on the same level as those on the other, they are preferably arranged on the same level for convenience to passengers in looking out of windows.

In accordance with the invention the stairs 20 are arranged within the vehicle, preferably just to the rear of the driver's seat 21, and in spaced relation with respect to the sides 22 and 23 of the vehicle, in which position it will be observed that the view as obtained from the usual rear view mirrors positioned in front of the driver is not obstructed on either side of the vehicle. This is a particularly desirable feature especially as regards the left side of the bus for it is on this side that other vehicles are accustomed to pass.

The stairway 20 leaves the lower deck in the region of maximum head-room under the raised portion 13 of the upper deck, and passes to the upper deck where it likewise opens into the region of maximum head-room provided by the lowered portion 14 of this deck. In doing so, the stairway preferably makes a quarter turn as shown opening out into the upper aisle 15. In order to insure sufficient head-room for the passengers mounting the lower step, the stairwell 24 in the upper deck is considerably enlarged or cut away at this point as shown at 25. This cut-away portion is continued rearwardly to a certain extent as shown at 26 where it curves inwardly to meet the head of the stairs. By thus making the area of the stairwell considerably larger than the horizontal projection of the stairs themselves, sufficient head-room for those using the stairs not only is provided, but in addition a view is afforded in both directions, completely up and down the curved stairs; thus enabling passengers about to use the stairs to determine whether or not another passenger is coming in the opposite direction. This eliminates any confusion which might arise in the event of two passengers meeting on the narrow stairs, a circumstance fraught with possible danger, particularly when the vehicle is in motion.

The upper stairwell is provided with railing members 27 as a necessary protective measure, and, in addition, the well is encased as shown at 28 in Fig. 4 to increase the safety factor. The sides of the stairs themselves are encased as shown at 29 and 30 also as a measure of safety. The casing 29 is preferably bulged outwardly to permit the installation of hand rail 31 without detracting at all from the useful width of the stairway. The casing 30 on the left also bulges outwardly as it rises to meet the cut-away portion of the stairwell, likewise permitting the installation of a hand railing 32. The arrangement thus provides an enclosed stairway of minimum width, but having sufficient room without inconveniencing the passengers using the same.

The spacing of the stairway from the left side 22 of the vehicle permits a passageway 35 around the stairwell in the region of maximum head-room on the upper deck, permitting the utilization of the space in front of the well for additional seats, and it further provides room for an additional seat on the lower deck to the rear of the stairs, having an unobstructed view out of the windows. The rear or under side of the stairway is preferably encased as shown at 33, and as a measure of safety the corners of this casing may be padded as at 34 and 34a.

From the foregoing description it is apparent that the available space is utilized in a manner to afford the maximum seating capacity on both the upper and lower decks of a vehicle provided with an inside stairway.

The arrangement further provides a vehicle of minimum over-all height with maximum head-room on both the lower and upper levels together with an enclosed stairway connecting the two regions of maximum head-room and requiring a minimum amount of space. Furthermore, the arrangement of the stairway affords the utmost safety for the passengers, particularly when the vehicle is in motion due to the manner of encasing the stairs; and also from the fact that an unobstructed view up or down the stairs is provided, avoiding the tendency to confusion that might arise in the event two passengers should attempt to use the stairs in opposite directions.

Although the invention has been illustrated in connection with a motor vehicle, it is obvious that it could be applied readily to vehicles of other types. It is further obvious that certain changes may be made in the above construction and different embodiments of the invention made without departing from the scope thereof. It is intended, therefore, that all matter contained in the description or shown in the accompanying drawings shall be interpreted as illustrative, and not in a limiting sense.

Having thus described the invention what is claimed, is:

1. A passenger vehicle having a deck arranged at a common level, a second deck arranged at a different level from the first deck and itself constructed in two different levels disposed respectively on opposite sides of a line extending longitudinally of the same, and adapted to accommodate passengers' seats on both levels, said second deck having a longitudinally extending aisle at the junction of its two levels and disposed in the plane of the lower level, and a stairway positioned within the vehicle and leading from said aisle to the other deck.

2. A passenger vehicle having a lower deck, an upper deck arranged thereover and constructed in two different levels disposed respectively on opposite sides of a line extending longitudinally of the same, and adapted to accommodate passengers' seats on both levels, said upper deck having an aisle extending longitudinally at the junction of its two levels and disposed in the plane of the lower level, and a stairway positioned within the vehicle and leading from a point on the lower deck vertically beneath the higher level of the upper deck, and delivering to said aisle on the upper deck; whereby passengers using said stairway will be afforded the maximum head room both at the entrance to the stairway and at the exit therefrom.

In testimony whereof, this specification has been duly signed by:

MICHAEL J. FORRESTER.